(12) United States Patent
Basso et al.

(10) Patent No.: US 7,466,715 B2
(45) Date of Patent: Dec. 16, 2008

(54) FLEXIBLE CONTROL BLOCK FORMAT FOR FRAME DESCRIPTION AND MANAGEMENT

(75) Inventors: Claude Basso, Raleigh, NC (US); Jean L. Calvignac, Raleigh, NC (US); Chih-jen Chang, Apex, NC (US); Philippe Damon, Raleigh, NC (US); Joseph F. Logan, Raleigh, NC (US); Fabrice J. Verplanken, La Gaude (FR)

(73) Assignee: International Business Machines Corporation, Armonk, NY (US)

(*) Notice: Subject to any disclaimer, the term of this patent is extended or adjusted under 35 U.S.C. 154(b) by 637 days.

(21) Appl. No.: 11/091,245

(22) Filed: Mar. 28, 2005

(65) Prior Publication Data

US 2006/0215677 A1    Sep. 28, 2006

(51) Int. Cl.
*H04L 12/28* (2006.01)
(52) U.S. Cl. .................. 370/412; 711/147; 711/170
(58) Field of Classification Search .......... 370/474, 370/466, 390, 473
See application file for complete search history.

(56) References Cited

U.S. PATENT DOCUMENTS

| | | | |
|---|---|---|---|
| 5,440,545 A | 8/1995 | Buchholz et al. ............. 370/60 |
| 5,493,569 A | 2/1996 | Buchholz et al. ........... 370/85.7 |
| 5,535,214 A | 7/1996 | Shiobara .................... 370/85.6 |
| 5,555,266 A | 9/1996 | Buchholz et al. ........... 370/95.1 |
| 5,561,785 A | 10/1996 | Blandy et al. .......... 395/497.01 |
| 5,617,083 A * | 4/1997 | Schwendeman et al. ... 340/7.43 |
| 5,640,563 A | 6/1997 | Carmon ...................... 395/672 |
| 5,729,681 A | 3/1998 | Aditya et al. ............. 395/200.1 |
| 5,751,951 A * | 5/1998 | Osborne et al. ............. 709/250 |
| 5,878,278 A | 3/1999 | Carreiro et al. ............. 395/859 |
| 5,892,925 A | 4/1999 | Aditya et al. ............. 395/200.6 |
| 6,038,592 A * | 3/2000 | Verplanken et al. ......... 709/215 |
| 6,085,218 A | 7/2000 | Carmon ...................... 709/107 |
| 6,112,272 A | 8/2000 | Gates ......................... 710/129 |
| 6,157,971 A | 12/2000 | Gates ......................... 710/100 |
| 6,181,705 B1 * | 1/2001 | Branstad et al. ............. 370/412 |

(Continued)

OTHER PUBLICATIONS

"High speed processing method for a production system compiler", K. Kurosawa et al, Transactions of the Information Processing Society of Japan, vol. 31, No. 9, pp. 1280-1292, 1990.

*Primary Examiner*—Huy D. Vu
*Assistant Examiner*—Abdullah Riyami
(74) *Attorney, Agent, or Firm*—Joscelyn G. Cockburn; James A. Lucas; Driggs, Hogg, Daugherty & Del Zoppo Co., LPA

(57) ABSTRACT

A communication network used to link information handling systems together utilizes a switching network to transmit data among senders and receivers. Each individual packet of data is described and controlled by an FCB. The bandwidth associated with the storing and distribution of data is optimized by chaining the data packets in different types of queues, or operating without chaining outside a queue. When a frame is in an output queue, the third word contains an RFCBA for egress of the frame to a line port, and an MCID for ingress from an output queue to a switch port. The RFCBA and the MCID have multicast capabilities. The format does not require a third word when a frame is in an input queue.

10 Claims, 8 Drawing Sheets

FCB FORMAT: Frame in TPQ

| Word | Bit 35–0 | | | | |
|---|---|---|---|---|---|
| 1 | NFA | | BCNT | | P |
| 2 | FBA | | SBP | MO | CRCA | P |
| 3 | RFCBA/MCID | TY | EBP | TB | LWM | P |

1M Frames
RFCBA: Ref FCB Address (for MC instance to Port)
MCID: Multicast Id (for MC to Switch)

U.S. PATENT DOCUMENTS

| | | | |
|---|---|---|---|
| 6,272,134 B1 * | 8/2001 | Bass et al. | 370/390 |
| 6,404,752 B1 | 6/2002 | Allen, Jr. et al. | 370/335 |
| 6,414,967 B2 * | 7/2002 | Van Grinsven et al. | 370/466 |
| 6,460,120 B1 | 10/2002 | Bass et al. | 711/148 |
| 6,477,168 B1 | 11/2002 | Delp et al. | 370/395.4 |
| 6,487,617 B1 | 11/2002 | Gates | 710/100 |
| 6,529,945 B1 * | 3/2003 | Calhoun et al. | 709/213 |
| 6,646,985 B1 * | 11/2003 | Park et al. | 370/229 |
| 7,032,228 B1 * | 4/2006 | McGillis et al. | 719/321 |
| 7,107,265 B1 * | 9/2006 | Calvignac et al. | 707/6 |
| 2002/0048270 A1 | 4/2002 | Allen, Jr. et al. | 370/392 |
| 2002/0061022 A1 | 5/2002 | Allen, Jr. et al. | 370/392 |
| 2002/0073223 A1 * | 6/2002 | Darnell et al. | 709/232 |
| 2002/0099855 A1 | 7/2002 | Bass et al. | 709/249 |
| 2002/0118690 A1 | 8/2002 | Calvignac et al. | 370/412 |
| 2002/0118693 A1 | 8/2002 | Calvignac et al. | 370/422 |
| 2002/0118694 A1 | 8/2002 | Calvignac et al. | 370/428 |
| 2002/0120890 A1 | 8/2002 | Calvignac et al. | 714/702 |
| 2002/0122386 A1 | 9/2002 | Calvignac et al. | 370/230 |
| 2002/0154634 A1 | 10/2002 | Basso et al. | 370/390 |
| 2002/0156908 A1 | 10/2002 | Basso et al. | 709/231 |
| 2002/0176429 A1 | 11/2002 | Calvignac et al. | 370/411 |
| 2002/0191642 A1 | 12/2002 | Calvignac et al. | 370/474 |
| 2003/0053472 A1 * | 3/2003 | Trevitt et al. | 370/412 |
| 2005/0141469 A1 * | 6/2005 | Miller et al. | 370/338 |
| 2005/0254493 A1 * | 11/2005 | Chang et al. | 370/389 |
| 2005/0276282 A1 * | 12/2005 | Wells et al. | 370/503 |
| 2006/0146881 A1 * | 7/2006 | Basso et al. | 370/476 |
| 2006/0161764 A1 * | 7/2006 | Alexander et al. | 713/2 |
| 2008/0109575 A1 * | 5/2008 | Dries et al. | 710/30 |

* cited by examiner

FCB GENERIC FORMATS

| Word | Bit 35...0 | | |
|---|---|---|---|
| 1 | NFA | BCNT | P |
| 2 | FBA | SBP | M O C R C A | P |
| 3 | RFCBA/MCID | T Y | EBP | T B | LWM | P |

1M Frames

Fig. 1

| Word | Bit 47...0 | | |
|---|---|---|---|
| 1 | NFA | BCNT | P |
| 2 | FBA | SBP | M O C R C A | P |
| 3 | RFCBA/MCID | T Y | EBP | T B | LWM | P |

2M Frames

Fig. 2

FCB FORMAT: Frame in TPQ

| Word | Bit 35...0 |
|---|---|
| 1 | NFA / BCNT |
| 2 | FBA / TY / SBP / MO CRCA / EBP / TB LWM P |
| 3 | (RFCBA/MCID) P |

1M Frames
RFCBA: Ref FCB Address
(for MC instance to Port)
MCID: Multicast Id
(for MC to Switch)

Fig. 3

| Word | Bit 47...0 |
|---|---|
| 1 | NFA / BCNT |
| 2 | FBA / TY / SBP / MO CRCA / EBP / TB LWM P |
| 3 | RFCBA/MCID P |

2M Frames

Fig. 4

FCB FORMAT: Frame in GQ

| Word | Bit 35...0 |
|------|---|
| 1 | NFA / BCNT / P |
| 2 | FBA / SBP / SP / AP / BP |
| 3 | Not Used |

- Minimal SBP field (Starting Byte Position) because of data format restrictions for frame in GQ
- 1M Frames
- 3rd entry not used: save Control Store bandwidth

FCB FORMAT: Multicast and Static Frames

MCIC: Multicast Instance Counter Used only in Reference frames to handle MC frame replication

| Word | Bit | | | |
|---|---|---|---|---|
| | 45 44 43 42 41 40 39 38 37 36 35 34 33 32 | 31 30 29 28 27 26 25 24 23 | 22 21 20 19 18 17 16 15 14 13 12 11 10 9 8 | 7 6 5 4 3 2 1 0 |
| 1 | | MCIC | | BCNT ...... P |
| 2 | FBA | | SBP | ...... P |
| 3 | | EBP | | LWM P |

1M Frames

Fig. 6

| Word | Bit | | | |
|---|---|---|---|---|
| | 47 46 45 44 43 42 41 40 39 38 37 36 35 34 33 32 | 31 30 29 28 27 26 25 24 23 22 21 | 20 19 18 17 16 15 14 13 12 11 10 9 8 | 7 6 5 4 3 2 1 0 |
| 1 | | MCIC | | BCNT ...... P |
| 2 | FBA | | SBP | ...... P |
| 3 | | EBP | | LWM P |

2M Frames

Fig. 7

FCB FORMAT: ATM Segm Control Block

| Word | Bit |
|---|---|
| 1 | CRC-32 |
| 2 | FBA |
| 3 | ATM CH |

CRC32: repository for generation of AAL5 CRC

ATMCH: ATM Cell Header to be sent in each AAL5 cell

1M Frames

Fig. 8

| Word | Bit |
|---|---|
| 1 | CRC-32 |
| 2 | FBA |
| 3 | ATM CH |

2M Frames

Fig. 9

FCB FORMAT: ATM Reasm Control Block

| Word | Bit 35..0 | | | | | | |
|---|---|---|---|---|---|---|---|
| 1 | LBA (31..10) | | 0 0 0 0 0 0 0 0 0 0 | | | | P |
| 2 | FBA | | SBP | | MO / CRC | | P |
| 3 | RFCBA | TY | EBP | | TB / LWM | | P |

LBA: Last Buffer Address Points to the Buffer where previous AAL5 cell has been received 1M Frames

Fig. 10

| Word | Bit 47..0 | | | | | | |
|---|---|---|---|---|---|---|---|
| 1 | LBA | | | 0 0 0 0 0 0 0 0 0 0 0 | | | P |
| 2 | FBA | | SBP | | MO / CRC | | P |
| 3 | RFCBA | TY | EBP | | TB / LWM | | P |

2M Frames

Fig. 11

FCB FORMAT: IP Reasm Control Block

FCB FORMAT: Free Queue

| Word | Bit 35 34 33 32 31 30 29 28 27 26 25 24 23 22 21 20 19 18 17 16 15 14 13 12 11 10 9 8 7 6 5 4 3 2 1 0 |
|------|---|
| 1 | NFA |
| 2 | |
| 3 | ECC |

2nd and 3rd entries not used: Save Control Store bandwidth

1M Frames

Fig. 14

| Word | Bit 47 46 45 44 43 42 41 40 39 38 37 36 35 34 33 32 31 30 29 28 27 26 25 24 23 22 21 20 19 18 17 16 15 14 13 12 11 10 9 8 7 6 5 4 3 2 1 0 |
|------|---|
| 1 | NFA |
| 2 | BCNT |
| 3 | |

2M Frames

Fig. 15

FLEXIBLE CONTROL BLOCK FORMAT FOR FRAME DESCRIPTION AND MANAGEMENT

FIELD OF THE INVENTION

This invention relates to network communication systems. More particularly, it relates to the use of frame control blocks to describe data packets. It also relates to the manipulation of frame control blocks to optimize the format for different uses of some frame control block fields and for maintaining consistent formats between low and high end configurations.

BACKGROUND OF THE INVENTION

With the worldwide interconnection of computers through the Internet, bandwidth is considered to be a critical resource. The increasing amount of network traffic driven by the net and other emerging applications is straining the capacity of network infrastructures. To keep pace, better technologies are constantly being sought to support and manage traffic growth.

The discussion which follows presupposes knowledge of network data communications, and switches and routers as used in communication networks. A fundamental understanding of bits, bytes, packets and frames in network communication is also helpful for the discussion that follows.

A switching network has switching points or nodes for transmission of data among senders and receivers connected to the network. The switching performed by these switching points is, in fact, the action of passing packets or "frames" of data received by a switching point or node to a further node in the network. This switching action is the means by which communication data is moved through a packet switching network.

Each node may comprise a packet processor configured to process the packets or frames of data. The packet processor may contain a data storage unit, such as a DRAM, configured with a plurality of buffers to store frame data. Each frame of data may be associated with a frame control block configured to describe the corresponding frame. Each frame control block may be associated with one or more buffer control blocks, wherein each buffer control block associated with a frame control block may be associated with a buffer in a data storage unit. Buffer control blocks and frame control blocks comprise various fields of information, wherein these fields are each supplied by a separate memory in the packet processor. Thus, the fields of information in the frame control blocks and the buffer control blocks may be obtained by accessing a separate memory in the packet processor.

SUMMARY OF THE INVENTION

The present invention relates to a communication network apparatus, such as the type used to link together information handling systems or computers of various types and capabilities, and to counterparts of such apparatus. In particular, the invention relates to the improved and multifunctional interface device and to methods of operating such a device to improve the data flow handling capability of network switches.

Throughout this description, the following terms are described as noted
AAL5 ATM adaptation word 5
ATM asynchronous transfer mode
BCB buffer control block
BCNT byte count, i.e. the total number of bytes in a packet
EBP ending byte position
FBA first buffer address
FCB frame control block, i.e. a descriptor of a frame in a network processor
FQCB flow queue control block
Frame packet of data
GQ G queue or temporary storage for a frame; an input queue of the network processor
LBA last buffer address
LWM longest word match
MC multicast
MCIC multicast instance counter
MCID multicast ID
MO mode, a two-bit field indicating the type of frame control block pointed at by the RFCBA field
NFA next frame control box address
QCB queue control block
RFCBA reference frame control block address
SBP starting byte position or segmentation control block
TB a bit representing a transient buffer. This is a buffer that is "transient", i.e. does not need to be retained after the end of transmission of its data, but instead can be released immediately.
TPQ an output queue of a network processor
TY Type. This is a two-bit field indicating the type of the frame associated to the FCB.

The present invention relates to the structuring of frame control blocks in a flexible format that allows frame description and manipulation. The frame control block describes a frame which is a discrete packet of data. The frame control blocks are organized to efficiently describe in different ways a data packet that can be chained in different types of queues, or can operate without chaining outside a queue. In this manner, the bandwidth of a control store can be optimized. The invention applies to buffer control blocks as well as frame control blocks.

Because messages are transient by nature, the present invention also reuses a field of a message to hold working information during a packet process. In addition, functions, such as ATM segmentation and reassembly, can reuse part of a frame control block when a frame is not ready for data movement. The invention supports system scalability by widening frame control block memory.

The invention also relates to a network communication system having an integrated circuit that provides capabilities for frame control blocks in a network architecture. Each frame control block contains information describing and managing a frame or packet of data. The FCB has a flexible format for a specified description and manipulation of the associated frame. The flexible format comprises multiple fields in one or more words, the fields containing information based upon the location of the frame. When the frame is in the output queue of a network processor, the processor contains a reference frame control block address for egress of the frame to a line port and a multicast identification for ingress from an output queue to a switch port. The reference frame control block address and multicast identification counter both have multicast capabilities. Most often, the frame is to be unicast, requiring an FCB format using two words. On the other hand, if the frame is to be multicast on the output line port or switch port, a third word is used.

When the frame is in the input queue of a network processor, the format does not require access to a third word, and does not require multicast capabilities or an end byte position locator. This format is useful for asynchronous transfer mode segmentation and reassembly and internet protocol reassembly for describing and controlling discrete data frames. In addition to the structure, the invention likewise relates to the method of using the frame control blocks and buffer control blocks in a flexible format to allow more efficient description and manipulation of frames.

The invention also relates to an article of manufacture which comprises a medium containing a computer readable program. When executed on a computer, the program causes the computer to execute operations that serve to increase the bandwidth available for describing and controlling data packets within a computer. The program provides commands for frame control blocks and buffer control blocks in the network processor. It also provides each control block with a description and management of a data packet for each frame control block. It provides each control block with a flexible format comprising multiple fields containing information based upon the location of a data packet.

BRIEF DESCRIPTION OF THE DRAWINGS

The drawings are presented to facilitate the understanding of the present invention without intending to limit the scope thereof. These drawings are briefly described as follows:

FIGS. 1 and 2 show a generic format for a frame control block for a template having either one million or two million frames;

FIGS. 3 and 4 show a frame control block wherein a packet is in an output queue of a network processor;

FIGS. 6 and 7 show a frame control block wherein a packet is in a reference frame or a static frame;

FIGS. 8 and 9 show a frame control block wherein a packet is being segmented;

FIGS. 10 and 11 show a frame control block wherein a packet is being reassembled;

FIGS. 12 and 13 show a frame control block wherein a packet is being reassembled for IP;

FIGS. 14 and 15 show a frame control block wherein a packet is in the free queue.

DETAILED DESCRIPTION OF THE INVENTION

Figures 5, 16:
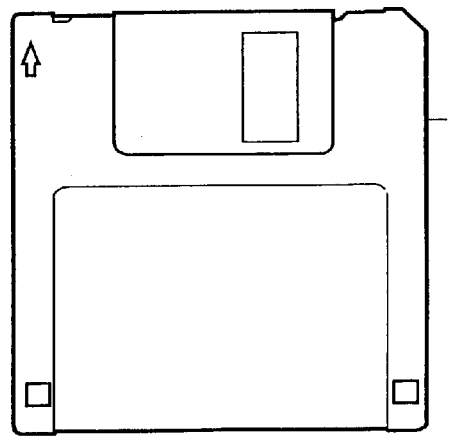
FIG. 5 shows a frame control block wherein a packet is in an input queue of a network processor.
FIG. 16 shows a typical medium for storage of the programs that are useful with the present invention.

The invention defines a format of frame control blocks that is both flexible and efficient in a communication system. An FCB is associated with each packet handled by the network processor and contains all the control information needed to describe and manage the packet (e.g. chaining pointer, packet length, etc . . . ). The frame control block may contain a next pointer field that gives the address of the next FCB in the queue. It does not, however, include any additional information relating to the next frame in a queue, but to the current frame that it defines and over which it exercises control.

Turning now to the drawings, FIGS. 1 and 2 show two (2) templates, FIG. 1 being used for a smaller system configuration supporting up to one million packets, and FIG. 2 used for a system configuration supporting up to two million packets. This is a flexibility feature that is built into the invention, recognizing that less memory area is needed to handle a template having one million packets instead of two million packets.

FIG. 1 shows an FCB generic format wherein the 36-bit wide memory is sufficient for one million frames while in FIG. 2, a template with two million frames (packets) relies on a 48-bit wide control memory. The names of the fields are only typical examples. Some fields are used in different ways as shown in the other drawings. The efficiency of the FCB flexible format is achieved by storing different types of information in some fields of the FCB, depending on where the associated frame is located. For example, in the MO (mode) field, a binary '00' means that the RFCBA field is not in use; a '01' means that the frame control block is being used as an ATM segmentation control block; and a '10' means that the frame control block is a reference FCB of a multicast frame. On the other hand, the TY (type) field is a two-bit field, wherein '00' indicates a unicast non-static frame; a '01' represents a multicast non-static frame; a '10' is a unicast static frame; and a '11' refers to a multicast static frame. By "static" is meant that the frame must be retained after transmission, whereby its frame control block must not be released to the free queue of the frame control blocks.

The network processor includes buffering and queueing structures. A packet can be chained in one of several queues, or it can be totally outside of any queue, for example when it is owned by some control logic that works on the packet (look-up, modification . . . ). Depending on the location of the packet, different control information may be relevant or not. This is why the FCB format is organized so that some fields can be used in different ways as shown in FIGS. 3, 4, and 6-15.

FIGS. 3 and 4 show an FCB format wherein the associated packet is in the TP Queue which is an output queue of the Network Processor. In that case, word #3 contains RFCBA for egress TPQ to line port, and MCID for ingress TPQ to switch port. RFCBA and MCID both handle packet multicast in different ways because the switch has built-in multicast capability while the line port does not. It should be understood that RFCBA/MCID field is used only if the frame will be multicast on the output line port or switch port. If the frame is just unicast (which is the most frequent case), then this field is not used.

FIG. 5 shows an FCB format in which the associated packet is in the G Queue which is an input queue of the network processor. Here, there is no need for any multicast feature. Therefore, the RFCBA or MCID features are not needed. Also, the dequeuer of this queue just needs to read the beginning of the packet and does not care about the exact position of the last byte in the packet. Accordingly, the EBP is not needed. Similarly, the TY, TB, and LWM fields are not used there. Thus, the format of the FCB is such that when the frame is dequeued from the G Queue, the third word of the FCB is not accessed, and bandwidth of the control memory is optimized.

FIGS. 6 and 7 show an FCB format having the associated packet in either a "reference frame" or a "static frame". In both cases, the packet is not queued in any queue, it is only pointed at by a specific pointer stored in other FCBs, such as the RFCBA. Thus, there is no need for chaining pointers. On the other hand, a specific function is performed on such packets. A multicast function relies on a counter that manages the replication of a packet. This counter is then conveniently stored in the unused chaining field. The MCIC occupies the area in word #1 that is used by NFA (next FCBA address) in regular packets.

FIGS. 14 and 15 show an FCB format in which the associated packet is in the free queue of an FCB. The free queue holds all FCBs not assigned yet to any frame. An incoming frame is associated to an FCB leased from the free queue. An outgoing frame gives back its FCB by releasing it into the free queue. The management of FCBs in the free queue is very simple since it has to deal only with the chaining function. This is why only NFA is shown. Then, bandwidth efficiency is achieved because only word #1 is accessed when leasing or releasing an FCB.

Another important feature of the FCB format is that FCBs can be used for other purposes. This is efficient because the same control structure is used for other functions. In particular, no additional free queue is needed (only manage a single free queue of FCBs). The functions that are contemplated are ATM segmentation and reassembly, and IP reassembly.

FIGS. 8 and 9 show an FCB format when a packet is being segmented for ATM AAL5. When the segmentation logic has been given a packet, it re-uses its FCB so that it can maintain the CRC (in word #1) and the ATM cell header (in word #3).

Figures 12, 13:
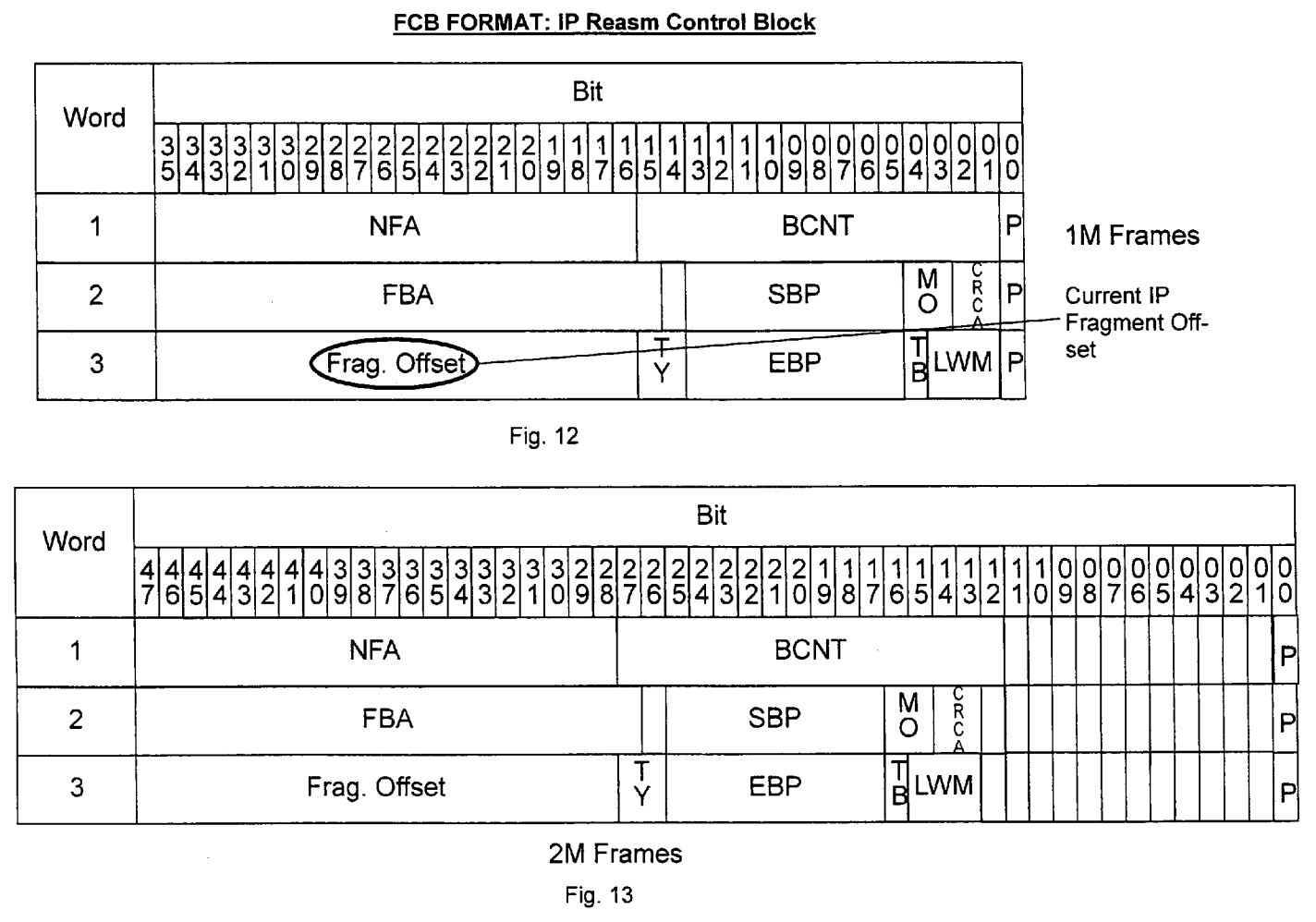

FIGS. 12 and 13 show an FCB format with a packet being reassembled for ATM AAL5. The reassembly logic maintains in word #1 the address of the cell buffer where the previous AAL5 cell has been received (LBA).

FIGS. 12 and 13 show an FCB format when a packet is being reassembled for IP. The reassembly logic maintains in word #3 the fragment offset of the packet reassembled so far.

FIGS. 14 and 15 show the two different templates wherein the FCB format is used in a free queue.

FIG. 16 shows a computer-readable medium in the form of a floppy disc 110 for containing the software implementation of the program to carry out the various steps of frame manipulation according to the present invention. Other machine readable storage mediums are fixed hard drives, optical discs, magnetic tapes, semiconductor memories, such as read-only memories (ROMs), programmable (PROMs), etc. The article containing this computer readable code is utilized by executing the code directly from the storage device, or by copying the code from one storage device to another storage device, or by transmitting the code on a network for remote execution.

The present invention can be realized in hardware, software, or a combination of the two. Any kind of computer system or other apparatus adapted for carrying out the methods described herein is suited. A typical combination of hardware and software could be a general purpose computer system that, when loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program instructions or a computer program in the present context mean any expression, in any language, code (i.e., picocode instructions) or notation, of a set of instructions intended to cause a system having an information processing capability to perform a particular function either directly or after either or both of the following occur: (a) conversion to another language, code or notation; (b) reproduction in a different material form.

While the invention has been described in combination with specific embodiments thereof, there are other alternatives, modifications, and variations that are likewise deemed to be within the scope thereof. Accordingly, the invention is intended to embrace all such alternatives, modifications and variations as fall within the spirit and scope of the appended claims.

What is claimed is:

1. A communication system having a network architecture utilizing, a frame control block containing information describing and managing a frame containing a packet of data, and having a flexible format for a specified description and manipulation of the associated frame, the flexible format comprising multiple fields containing information based upon the location of the frame either within a queue or outside of a queue, wherein said frame is in the output queue of a network processor and includes at least three words, the third word containing a reference frame control block address for egress of the frame to a line port and a multicast counter for ingress from an output queue to a switch port frame control block address, said reference frame control block address and multicast counter both having multicast capabilities.

2. The system having a frame control block according to claim 1, wherein the flexible format is useful for asynchronous transfer mode segmentation and reassembly and internet protocol reassembly for describing and controlling discrete frames.

3. The system having a frame control block according to claim 1, wherein the frame control block is organized with other frame control blocks to describe the chaining of packet descriptors in different queues including ingress queues, egress queues and free queues.

4. An integrated circuit for a network architecture and utilizing a plurality of frame control blocks, each of which contains information describing and managing a frame comprising a packet of data, each frame control block having a flexible format for a specified description and manipulation of the associated frame, the flexible format comprising multiple fields containing information based upon the location of the frame either within or outside a queue, wherein the frame is in the output queue of a network processor and includes at least three words, the third word containing a reference frame control block address for egress of the frame to a line port and a multicast counter for ingress from an output queue to a switch port, said reference frame control block address and multicast counter both having multicast capabilities.

5. The integrated circuit according to claim 4 wherein the format is useful for asynchronous transfer mode segmentation and reassembly and internet protocol reassembly for describing and controlling discrete frames.

6. The integrated circuit according to claim 4 wherein each frame control block is capable of being organized with other frame control blocks to describe the chaining of packet descriptors in different queues including ingress queues, egress queues and free queues.

7. A network communication system utilizing a plurality of frame control blocks, each block containing information describing a frame comprising a packet of data and having a flexible format for a specified description and manipulation of the associated frame, the flexible format comprising multiple fields containing information based upon the location of the frame either within a queue or outside of a queue, wherein the frame is in the output queue of a network processor and includes at least three words, the third word containing a reference frame control block address for egress of the frame to a line port and a multicast counter for ingress from an output queue to a switch port, said reference frame control block address and multicast counter both having multicast capabilities.

8. A method for describing and manipulating a plurality of data packets comprising providing a frame control block for each data packet, each frame control block having a flexible format composed of multiple fields containing information the asynchronous transfer mode segmentation and reassembly and internet protocol reassembly for describing and controlling discrete data packets, wherein the frame is in the output queue of a network processor and includes at least three words, the third word containing a reference frame control block address for egress of the frame to a line port and a multicast counter for ingress from an output queue to a switch port, wherein a reference frame control block address and multicast counter both have multicast capabilities.

9. The method according to claim 8 wherein each frame control block cooperates with other frame control blocks to describe the chaining of data packet descriptors in different queues including ingress queues, egress queues and free queues.

10. An article of manufacture comprising a medium usable in a network processor and having a computer readable program embodied in said medium, wherein the computer readable program, when executed on a computer, causes the computer to execute the following operations:
(a) provide commands for frame control blocks and buffer control blocks in the network processor;
(b) provide each control block with a description and management of a data packet for each frame control block;
(c) provide each control block with a flexible format comprising multiple fields containing information based upon the location of a data packet;
(d) provide commands for the asynchronous transfer mode segmentation and reassembly and internet protocol reassembly for describing and controlling discrete data packets, wherein a data packet is in the output queue of a network processor and includes at least three words,
e) provide controls for the program to control a reference frame control block address for egress of the data packet to a line port and a multicast counter for ingress from an output queue to a switch port, and
(f) provide both a reference frame control block address and multicast counter with multicast capabilities

* * * * *